United States Patent [19]
Pettersen

[11] 3,940,870
[45] Mar. 2, 1976

[54] BAIT HOLDER

[76] Inventor: Kjell Pettersen, 819 Patton Place Road, Forked River, N.J. 08731

[22] Filed: Jan. 23, 1975

[21] Appl. No.: 543,275

[52] U.S. Cl. .................................. 43/44.2; 43/57.5 R
[51] Int. Cl.² .......................................... A01K 83/06
[58] Field of Search ..... 43/44.2, 44.8, 44.82, 43.16, 43/5, 6, 42.7, 54.5 R, 57.5 R

[56] References Cited
UNITED STATES PATENTS

| 531,140 | 12/1894 | Stapp | 43/44.8 |
| 2,821,046 | 1/1958 | Fisk | 43/44.2 |
| 2,970,399 | 2/1961 | Frohlich et al. | 43/6 |
| 3,179,351 | 4/1965 | Ehlert | 43/54.5 R |
| 3,772,819 | 11/1973 | Ratzlaff | 43/26 |

Primary Examiner—Warner H. Camp
Attorney, Agent, or Firm—Roger A. Clapp

[57] ABSTRACT

A bait holding device has an elongated rod divided by a hand plate and has a handle and line attaching loop member on one end and a plurality of projecting barbs and a line attaching loop member on the other end. A container encapsulates the bait holding device and is divided into a sheath at one end and a top container at the other end.

10 Claims, 2 Drawing Figures

U.S. Patent  March 2, 1976  3,940,870 ived into two portions by a hand guard or plate 13.

BAIT HOLDER

BACKGROUND OF THE INVENTION

This invention relates to angling apparatus and pertains in particular to a device for holding crab bait.

DESCRIPTION OF THE PRIOR ART

In one crabbing technique, bait such as a fish head, fish body or tail is tied or attached to a weighted line and dropped into the water. When a crab takes the bait, the line is gently withdrawn until the crab is brought near the surface of the water. When the crab is within range, it is scooped out with a hand net.

Heretofore, the bait has been attached to the drop line by way of a wire, hook or the like. In use, however the bait tends to break away from the holding wire or hook. Moreover, it is an unpleasant and messy task to insert the wire or hook through the bait.

Accordingly, one object of this invention is to simplify the attachment to and improve the retention of bait on the holding device.

SUMMARY OF THE INVENTION

In accordance with the preferred embodiment of this invention, a bait holding device comprises a sharpened, rigid rod having a handle on one end and bait gripping means on the sharpened end.

In accordance with one feature of this invention, the bait gripping means includes projecting barbs which facilitate bait retention.

In accordance with another feature of this invention, the handle end of the bait holding device includes a pressure plate or hand guard for facilitating insertion of the bait holder through the bait.

In accordance with another feature of this invention, the bait holding device is encapsulated by a container having a sheath at one end and a top container at the other end.

In accordance with another feature of this invention, the top container is adapted to accommodate accessories typically used when crabbing.

These and other objects and features of this invention will be more readily understood by reference to the following detailed description and drawing.

DETAILED DESCRIPTION OF THE INVENTION

Figure 1:
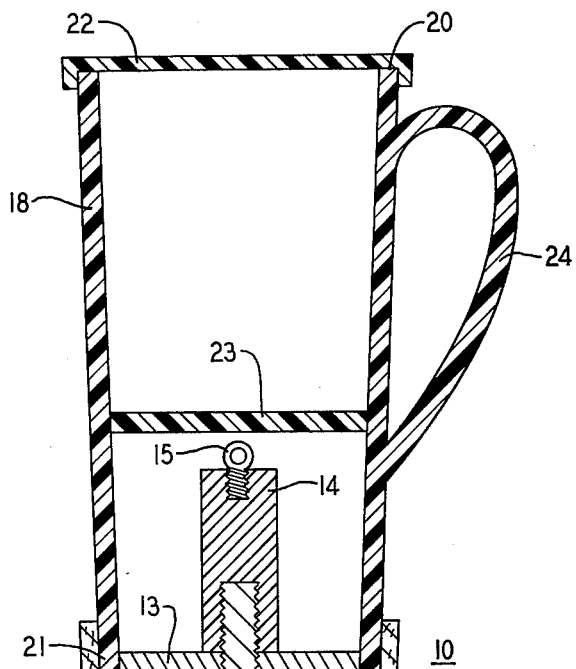
FIG. 1 is a front elevation view of a bait holding device made in accordance with this invention and having parts broken away to show interior portions.

Referring to FIG. 1, a bait holding device 10 is disclosed which comprises an elongated bait rod 11 and an encapsulating housing 12. The bait rod 11 is made of a rigid material such as plastic and may have a number of different cross-sections. Moreover, it may have different cross-sections in different portions of its length.

Figure 2:
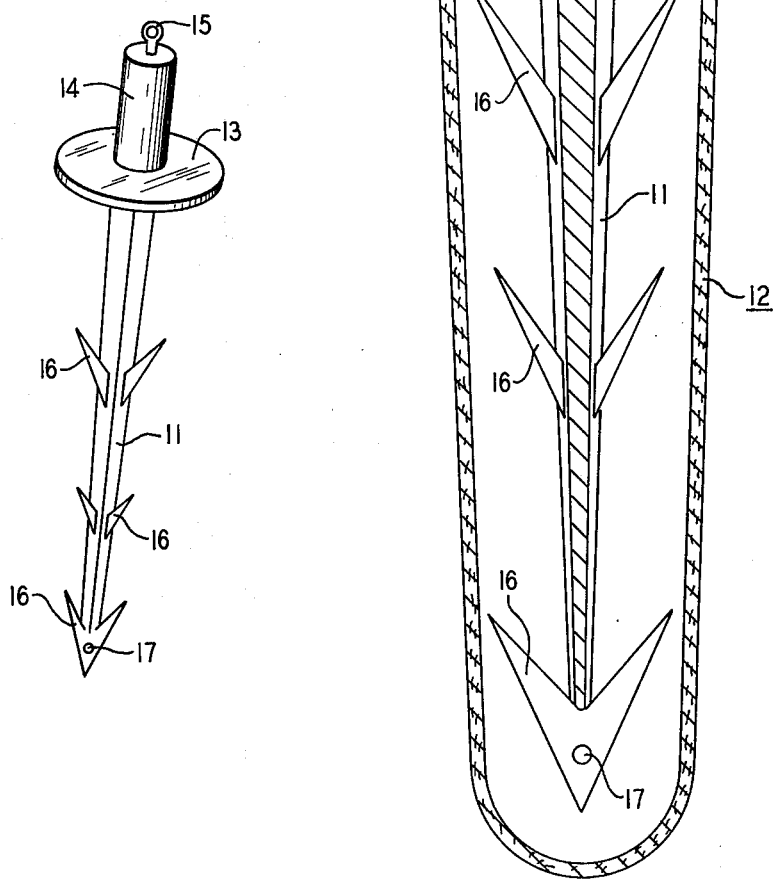
FIG. 2 is a perspective view of a bait rod made in accordance with this invention.

In the embodiment illustrated, the bait rod 11 is divided into two portions by a hand guard or plate 13. One of the two portions functions as a grip 14 which, as best seen in FIG. 2, may advantageously be circular in cross-section. The other portion serves as a bait retainer and, in the embodiment shown, is a shaft having a triangular cross-section.

The grip 14 may be surfaced with a suitable gripping material such as rubber or the like, and terminates in an eyebolt 15 adapted to accept a tie-on drop line. The grip 14 is firmly attached to the plate 13, and for reasons which will become apparent later, the plate 13 is advantageously circular in configuration.

The second portion of the bait rod 11 tapers to a point and includes a plurality of barbs 16. In the embodiment illustrated, the barbs 16 are directed outwardly from the bait rod 11 and are inclined at an angle such that they project toward the plate 13. With this configuration, insertion of the bait rod 11 into a bait will be facilitated and retention of the bait will be increased by virtue of the backwardly directed barbs 16. The second portion of the bait rod 11 terminates in a point and includes an aperture 17 suitable for accepting a weight or line. When the second portion is inserted into a bait, the hand guard 13 will help concentrate the inserting force and thereby facilitate and simplify the baiting operation.

The housing 12 is a container comprising a top section 18 and a sheath section 19. The sheath section 19 is advantageously circular at the point where it engages the top section 18 and may advantageously include an elasticized material in its periphery. It may be made of any tough, flexible material such as plastic, leather, or the like as its function is to enclose the barbs 16. Advantageously, the sheath section 18 includes a notch for permitting access for a drop line 14 as desired.

The top section 18 is advantageously cylindrical in cross-section and includes an upper lip 20 at one end and a lower lip 21 at the other end. The upper lip 20 is adapted to accommodate a cover cap 22. The lower lip 21 is adapted to cooperate with the open end of the sheath section 19; i.e., its elasticized lip, so as to form an encapsulating housing. Moreover, it is circular so as to frictionally hold the plate 13. Advantageously, the top section 18 may include an intermediate plate or disk 23 adapted to divide the top section 18 into upper and lower compartments. The lower compartment accommodates the grip 14, while the upper compartment will accommodate accessory items such as the drop line, weights, etc. Furthermore, the top section 18 may be equipped with a handle 24. When so equipped, and the intermediate disk 23 is permanently attached, it will readily serve as a drinking container for beverages, such as water, coffee or the like.

The top section 18 and sheath section 19 can also be used without the bait rod 11; i.e., for a fishing accessory. In that application, the sheath section 19 can be used as a bait holder while the top section 18 can serve as a tackle storage container, cup or the like.

In summary, a bait holding device has been disclosed which cooperates with a container to improve bait retention and facilitate attachment of the bait to drop line. Moreover, the resulting device simultaneously protects the user while offering handy accessory uses. It will be readily understood, however, that the embodiment of the invention shown is illustrative of the principles of the invention and many other embodiments falling within the scope of the invention will readily occur to those skilled in the art.

What I claim is:

1. In apparatus for holding a bait, the combination comprising:

elongated rod means made of a substantially rigid material;

guard means for concentrating bait engaging force, said guard means dividing said rod into first and second portions and having a perimeter projecting outwardly from said rod to define the outer limit of a space surrounding said portions;

grip means included in said first portion and abutting said guard means;

apertures for accepting tie-on lines, one aperture being located at each end of said rod means, and a plurality of bait engaging barbs projecting outwardly from said second portion wherein each barb projects outwardly a distance less than the distance between said second portion and said outer limit whereby said guard means can accomodate and hold in place a barb covering sheath surrounding said second portion.

2. The combination in accordance with claim 1 wherein said barbs are angled towards said guard means.

3. The combination in accordance with claim 2 wherein said barbs are disposed symmetrically on said rod means.

4. The combination in accordance with claim 3 wherein said rod means includes a multi-sided shaft.

5. The combination in accordance with claim 4 wherein a portion of the cross-section of said shaft is triangular in configuation.

6. The combination in accordance with claim 1 further including an encapsulating housing wherein said housing is divided into a top container and a sheath section, said sheath section and said top container being adapted to removably join each other and said sheath section being adapted to protectively accommodate said second portion.

7. The combination in accordance with claim 6 wherein said top container is cylindrical in shape and includes a first lip at one end and a second lip at the other end, said first lip being adapted to accept a cover cap and said second lip being adapted to engage said sheath section and said guard means.

8. The combination in accordance with claim 7 wherein said top container includes a handle disposed between said first and second lips.

9. The combination in accordance with claim 8 wherein said top container includes disk means dividing said top container into first and second compartments, said first compartment being adapted to accommodate said grip means and said second compartment being adapted to accommodate suitable user accessories.

10. In apparatus for holding a bait, the combination comprising:

elongated rod means made of a substantially rigid material;

guard means for concentrating bait engaging force, said guard means dividing said rod into first and second portions;

grip means included in said first portion and abutting said guard means;

apertures for accepting tie-on lines, one aperture being located at each end of said rod means;

a plurality of bait engaging barbs projecting from said second portion, and an encapsulating housing wherein said housing is divided into a sheath section and a cylindrical top container, said sheath section being adapted to protectively accomodate said second portion and said top section having an exterior handle, a lip at one end adapted to accept a cover cap, a lip at the other end adapted to removably engage said sheath section and said guard means, and disk means for dividing the interior thereof into first and second compartments suitable for accomodating said grip means and selected user accessories, respectively.

* * * * *